United States Patent
Boysen et al.

(10) Patent No.: US 10,205,195 B2
(45) Date of Patent: Feb. 12, 2019

(54) ALKALI METAL ION BATTERY WITH BIMETALLIC ELECTRODE

(71) Applicant: Massachusetts Institute of Technology, Cambridge, MA (US)

(72) Inventors: Dane A. Boysen, Pasadena, CA (US); David J. Bradwell, Arlington, MA (US); Kai Jiang, Malden, MA (US); Hojong Kim, State College, PA (US); Luis A. Ortiz, Natick, MA (US); Donald R. Sadoway, Cambridge, MA (US); Alina A. Tomaszowska, Bienkowice (PL); Weifeng Wei, Hunan (CN); Kangli Wang, Malden, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 281 days.

(21) Appl. No.: 14/678,602

(22) Filed: Apr. 3, 2015

(65) Prior Publication Data

US 2015/0214579 A1    Jul. 30, 2015

Related U.S. Application Data

(63) Continuation of application No. 13/237,215, filed on Sep. 20, 2011, now Pat. No. 9,000,713.

(Continued)

(51) Int. Cl.
*H01M 10/39* (2006.01)
*H01M 4/36* (2006.01)
(Continued)

(52) U.S. Cl.
CPC .......... *H01M 10/39* (2013.01); *H01M 4/364* (2013.01); *H01M 4/38* (2013.01); *H01M 4/381* (2013.01);
(Continued)

(58) Field of Classification Search
CPC ...... H01M 10/39; H01M 4/381; H01M 4/364; H01M 4/38; H01M 4/40; H01M 10/399; H02J 7/0052; H02J 7/0042
See application file for complete search history.

(56) References Cited

U.S. PATENT DOCUMENTS

| 3,238,437 A | 3/1966 | Foster et al. |
| 3,245,836 A | 4/1966 | Agruss |

(Continued)

FOREIGN PATENT DOCUMENTS

| EP | 0078404 A2 | 5/1983 | ............ H01M 14/00 |
| EP | 0327959 | 8/1989 | ............ H01M 10/14 |

(Continued)

OTHER PUBLICATIONS

"A new proposal for the binary (Sn,Sb) phase diagram and its thermodynamic properties based on a new e.m.f study" Journal of Alloys and Compounds 247 (1997) 223-233, available Jan. 1997, by Vassiliev et al.*

(Continued)

*Primary Examiner* — Michael L Dignan
(74) *Attorney, Agent, or Firm* — Sunstein Kann Murphy & Timbers LLP

(57) ABSTRACT

Electrochemical cells having molten electrodes having an alkali metal provide receipt and delivery of power by transporting atoms of the alkali metal between electrode environments of disparate chemical potentials through an electrochemical pathway comprising a salt of the alkali metal. The chemical potential of the alkali metal is decreased when combined with one or more non-alkali metals, thus producing a voltage between an electrode comprising the molten alkali metal and the electrode comprising the combined alkali/non-alkali metals.

27 Claims, 9 Drawing Sheets

Related U.S. Application Data

(60) Provisional application No. 61/384,564, filed on Sep. 20, 2010.

(51) Int. Cl.
   H01M 4/38      (2006.01)
   H01M 4/40      (2006.01)
   H02J 7/00      (2006.01)

(52) U.S. Cl.
   CPC ........... *H01M 4/40* (2013.01); *H01M 10/399* (2013.01); *H02J 7/0042* (2013.01); *H02J 7/0052* (2013.01)

(56) References Cited

U.S. PATENT DOCUMENTS

| | | | |
|---|---|---|---|
| 3,419,432 A | 12/1968 | Hesson | |
| 3,488,221 A * | 1/1970 | Shimotake | H01M 10/399 429/103 |
| 3,535,214 A | 10/1970 | Winand | 204/64 |
| 3,663,295 A * | 5/1972 | Baker | H01M 6/36 429/102 |
| 3,716,409 A | 2/1973 | Cairns et al. | |
| 3,775,181 A | 11/1973 | Ryerson | |
| 3,833,421 A | 9/1974 | Rubischko et al. | |
| 3,933,521 A | 1/1976 | Vissers et al. | |
| 4,011,374 A | 3/1977 | Kaun | |
| 4,216,273 A | 8/1980 | Cadart et al. | |
| 4,999,097 A | 3/1991 | Sadoway | |
| 5,185,068 A | 2/1993 | Sadoway | |
| 5,476,733 A | 12/1995 | Coetzer et al. | |
| 6,368,486 B1 | 4/2002 | Thompson et al. | |
| 6,730,210 B2 | 5/2004 | Thompson et al. | |
| 6,733,924 B1 | 5/2004 | Skotheim et al. | |
| 7,504,017 B2 | 3/2009 | Cardarelli | 205/398 |
| 7,678,484 B2 | 3/2010 | Tao et al. | |
| 8,178,231 B2 | 5/2012 | Soloveichik et al. | |
| 8,202,641 B2 | 6/2012 | Winter et al. | |
| 8,460,814 B2 | 6/2013 | Deane et al. | |
| 8,764,962 B2 | 7/2014 | Allanore et al. | 205/367 |
| 9,000,713 B2 | 4/2015 | Boysen et al. | |
| 9,076,996 B2 | 7/2015 | Bradwell et al. | |
| 2007/0215483 A1 | 9/2007 | Johansen et al. | 205/358 |
| 2008/0023321 A1 | 1/2008 | Sadoway | 204/243.1 |
| 2008/0044725 A1 | 2/2008 | Sadoway et al. | |
| 2008/0053838 A1 | 3/2008 | Yamaguchi et al. | |
| 2008/0145755 A1 | 6/2008 | Iacovangelo et al. | |
| 2010/0047671 A1 | 2/2010 | Chiang et al. | |
| 2011/0014503 A1 | 1/2011 | Bradwell et al. | |
| 2011/0014505 A1 | 1/2011 | Bradwell et al. | |
| 2011/0200848 A1 | 8/2011 | Chiang et al. | |
| 2012/0264021 A1 | 10/2012 | Sugiura et al. | |
| 2013/0059176 A1 | 3/2013 | Stefani et al. | |
| 2013/0065122 A1 | 3/2013 | Chiang et al. | |
| 2013/0071306 A1 | 3/2013 | Camp et al. | |
| 2014/0113181 A1 | 4/2014 | Bradwell et al. | |
| 2015/0004455 A1 | 1/2015 | Bradwell et al. | |
| 2015/0015210 A1 | 1/2015 | Bradwell et al. | |
| 2015/0132627 A1 | 5/2015 | Bradwell et al. | |
| 2015/0132628 A1 | 5/2015 | Bradwell et al. | |

FOREIGN PATENT DOCUMENTS

| | | | |
|---|---|---|---|
| EP | 0343333 | 11/1989 | H01M 2/06 |
| EP | 1096593 | 5/2001 | H01M 10/48 |
| JP | 55-53877 | 4/1980 | H01M 10/36 |
| JP | 2001-115369 | 4/2001 | D04H 1/46 |
| WO | WO 2008/105811 A2 | 9/2008 | |
| WO | WO 2011/014242 | 2/2011 | H01M 2/14 |
| WO | WO 2011/014243 | 2/2011 | H01M 2/14 |
| WO | WO 2014/062706 | 4/2014 | H01M 10/50 |
| WO | WO 2014/190318 | 11/2014 | H01M 10/04 |

OTHER PUBLICATIONS

Allanore, "A new anode material for oxygen evolution in molten oxide electrolysis," Nature, vol. 497, pp. 353-356, May 16, 2013.
Allanore, "Features and Challenges of Molten Oxide Electrolytes for Metal Extraction," Journal of the Electrochemical Society, vol. 162, No. 1, pp. E13-E22, Nov. 25, 2014.
Bradwell, "Technical and Economic Feasibility of a High-Temperature Self-Assembling Battery," Thesis, Massachusetts Institute of Technology, Department of Materials Science and Engineering, 136 pages, Sep. 2006.
Bradwell, "Liquid Metal Batteries: Ambipolar Electrolysis and Alkaline Earth Electroalloying Cells," Thesis, Massachusetts Institute of Technology, Department of Materials Science and Engineering, 206 pages, Feb. 2011.
Bradwell et al. "Recycling ZnTe, CdTe, and Other Compound Semiconductors by Ambipolar Electrolysis," Journal of the American Chemical Society, vol. 133, pp. 19971-19975, Oct. 28, 2011.
Bradwell et al., "Supporting Information: Recycling ZnTe, CdTe, and Other Compound Semiconductors by Ambipolar Electrolysis," Journal of the American Chemical Society, pp. S1-S8, Oct. 28, 2011.
Electroville, Grid-Scale Batteries, ARPA-E, MIT Electroville: High Amperage Energy Storage Device-Energy for the Neighborhood, http://arpa-e.energy.gov/?q=slick-sheet-project/electroville-grid-scale-batteries, 1 page, Accessed Jul. 2, 2015.
U.S. Department of Energy, U.S. Department of Energy Categorical Exclusion Determination Form, ARPA-E, 25A/1089-Electroville: High-Amperage Energy Storage Device-Energy Storage for the Neighborhood, 2 pages, Jan. 15, 2010.
Kim et al., "Electrolysis of Molten Iron Oxide with an Iridium Anode: The Role of Electrolyte Basicity," Journal of the Electrochemical Society, vol. 158, No. 10, pp. E101-E105, Aug. 5, 2011.
Kipouros et al., "Toward New Technologies for the Production of Lithium," JOM, pp. 24-26, May 1998.
Magnuski, Innovations in Energy Storage—Professor Don Sadoway Video, MIT Club of Northern California, https://vimeo.com/20906061, 50 pages, Mar. 8, 2011.
Sadoway, "The Electrochemical Processing of Refractory Metals," JOM, pp. 15-19, Jul. 1991.
Sadoway, "New opportunities for waste treatment by electrochemical processing in molten salts," Metals and Materials Waste Reduction, Recovery and Remediation, Edited by K.C. Liddell, R.G. Bautista and R.J. Orth, The Minerals, Metals & Materials Society, pp. 73-76, 1994.
Sadoway, "New opportunities for metals extraction and waste treatment by electrochemical processing in molten salts," J. Mater. Res., vol. 10, No. 3, pp. 487-492, Mar. 1995.
Sadoway, "A Technical Feasibility Study of Steelmaking by Molten Oxide Electrolysis," presented at 9th AISI/DOE TRP Industry Briefing Session, 16 pages, Oct. 10, 2007.
Sadoway, "Electrochemical Pathways Towards Carbon-Free Metals Production," presented at GCEP Carbon Management in Manufacturing Industries, 55 pages, Apr. 15, 2008.
Sadoway, "Innovation in Energy Storage: What I Learned in 3.091 was all I Needed to Know" Video, MIT Technology Day 2010, 53 pages, Jun. 5, 2010.
Villar, "Assessment of High-Temperature Self-Assembling Battery Implementation based on the Aluminum Smelting Process," Thesis, Massachusetts Institute of Technology, Department of Materials Science and Engineering, 129 pages, Sep. 2010.
Agruss, "The Thermally Regenerative Liquid-Metal Cell," Journal of the Electrochemical Society, vol. 110, No. 11, pp. 1097-1103, Nov. 1963.
Atthey, "A Mathematical Model for Fluid Flow in a Weld Pool at High Currents," J. Fluid Mech., vol. 98, Part 4, pp. 787-801, 1980.
Cairns et al., "Galvanic Cells with Fused-Salt Electrolytes," AEC Research and Development, Argonne National Laboratory, Chemical Engineering Division, 44 pages, Nov. 1967.
Cairns et al., "High-Temperature Batteries—Research in high-temperature electrochemistry reveals compact, powerful energy-storage cells," Science, vol. 164, No. 3886, pp. 1347-1355, Jun. 20, 1969.

(56) References Cited

OTHER PUBLICATIONS

Cubicciotti et al., "Metal-Salt Interactions at High Temperatures: The Solubilities of Some Alkaline Earth Metals in their Halides," Journal of the American Chemical Society, vol. 71, No. 6, pp. 2149-2153, 1949.

Dworkin et al., "The Electrical Conductivity of Solutions of Metals in Their Molten Halides," The Journal of Physical Chemistry, vol. 70, No. 7, pp. 2384-2388, Jul. 1966.

Gay et al., "Lithium/Chalcogen Secondary Cells for Components in Electric Vehicular-Propulsion Generating Systems," Argonne National Laboratory, Argonne, Illinois, ANL-7863, 62 pages, Jan. 1972.

Jarrett et al., "Advances in the Smelting of Aluminum," Aluminum Company of America, Metallurgical Treatises, Warrendale, Pennsylvania: The Metallurgical Society of AIME, pp. 137-157, 1981.

Pongsaksawad et al., "Phase-Field Modeling of Transport-Limited Electrolysis in Solid and Liquid States," Journal of the Electrochemical Society, vol. 154, No. 6, pp. F122-F133, 2007.

Shimotake et al., "Bimetallic Galvanic Cells With Fused-Salt Electrolytes," Argonne National Laboratory, Argonne, Illinois, pp. 951-962, 1967.

Shimotake et al., "Secondary Cells with Lithium Anodes and Immobilized Fused-Salt Electrolytes," I&EC Process Design and Development, vol. 8, No. 1, pp. 51-56, Jan. 1969.

Weaver et al., "The Sodium|Tin Liquid-Metal Cell," Journal of the Electrochemical Society, vol. 109, No. 8, pp. 653-657, Aug. 1962.

International Searching Authority, International Search Report—International Application No. PCT/US2007/018168, dated Sep. 18, 2008, together with the Written Opinion of the International Searching Authority, 13 pages.

European Patent Office, Extended European Search Report—Application No. 13196841.4-1360, dated Feb. 12, 2014, 7 pages.

International Searching Authority, International Search Report—International Application No. PCT/US2010/002035, dated Feb. 7, 2011, together with the Written Opinion of the International Searching Authority, 16 pages.

International Searching Authority, International Search Report—International Application No. PCT/US2011/052316, dated Dec. 29, 2011, together with the Written Opinion of the International Searching Authority, 12 pages.

Li, H., et al., "High Performance Liquid Metal Battery with Environmentally Friendly Antimony—Tin Positive Electrode," *ACS Appl. Mater. Interfaces,* vol. 8, Issue 20, pp. 12830-12835, May 2016.

Li et al., Supporting Information for "*High Performance Liquid Metal Battery with Environmentally Friendly Antimony—Tin Positive Electrode*", ACS Appl. Mater. Interfaces, vol. 8, Issue 20, Published by American Chemical Society, pp. S-1-S-5, May 5, 2016.

Wang et al., Letter: "*Lithium—antimony—lead liquid metal battery for grid-level energy storage*", Nature, Macmillan Publishers Limited, vol. 514, Issue 7522, 8 pages, Oct. 16, 2014.

\* cited by examiner

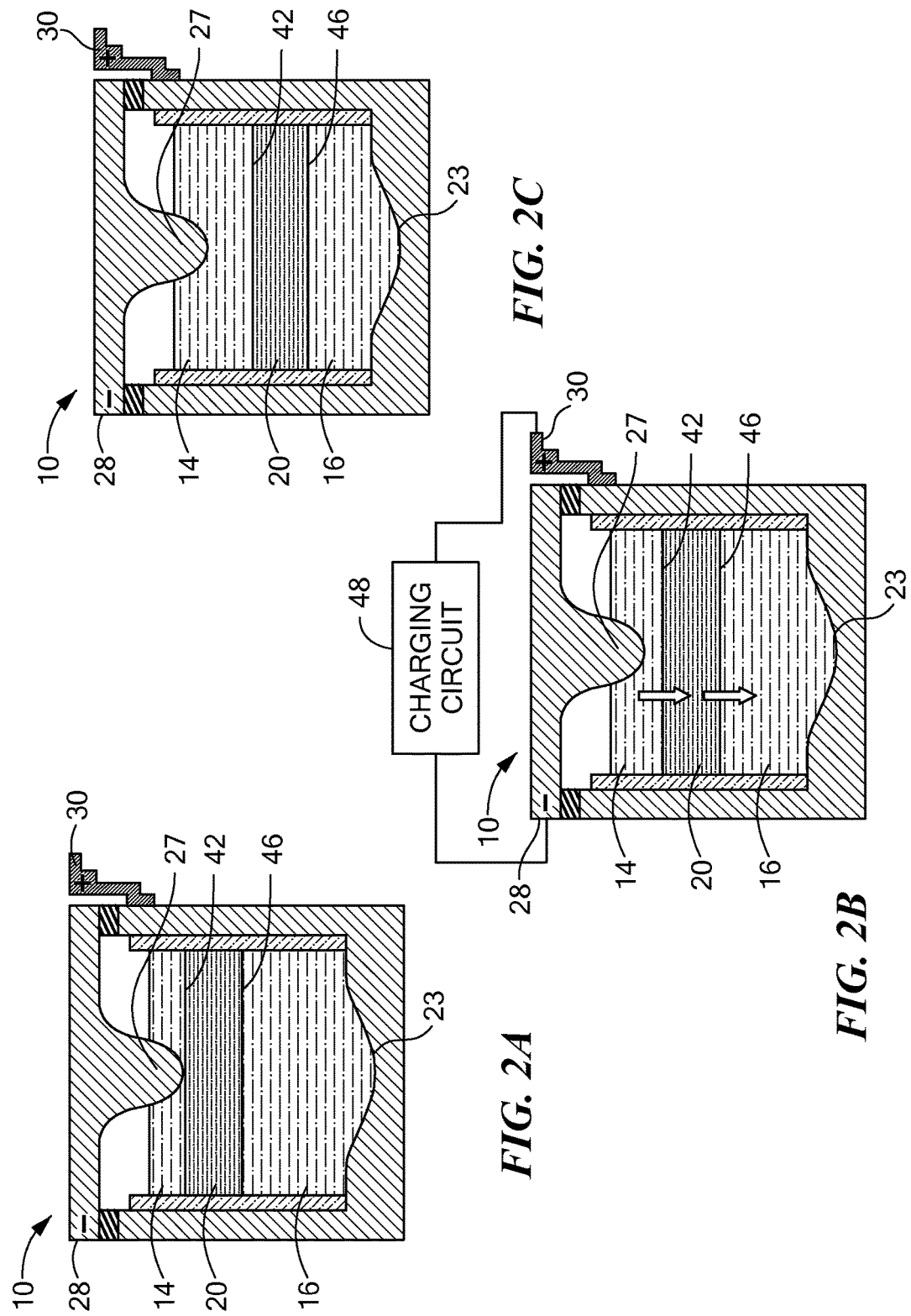

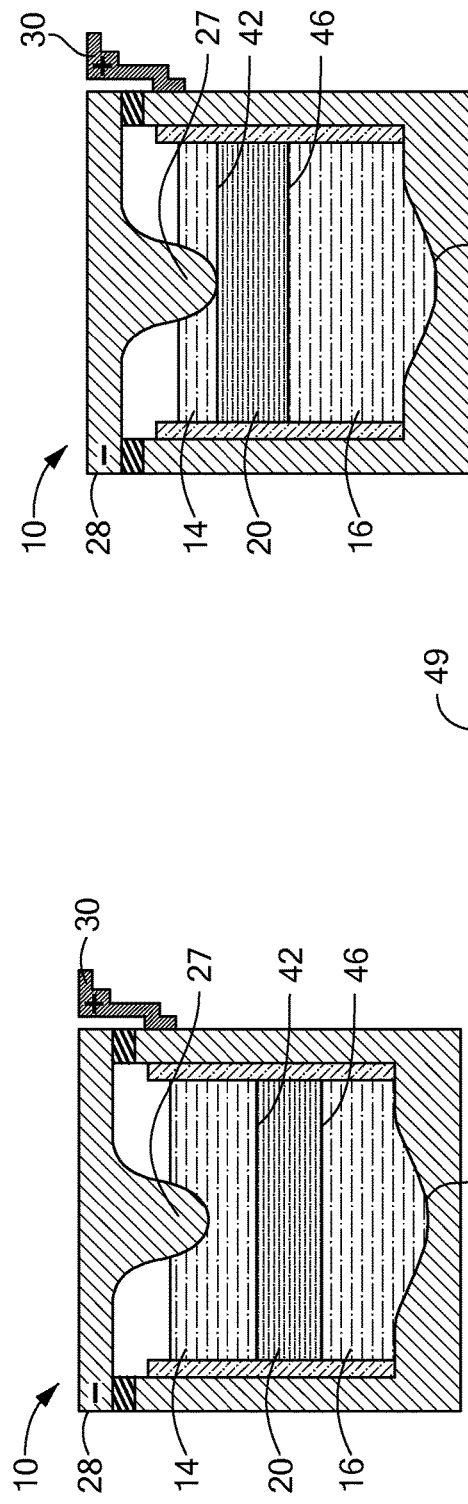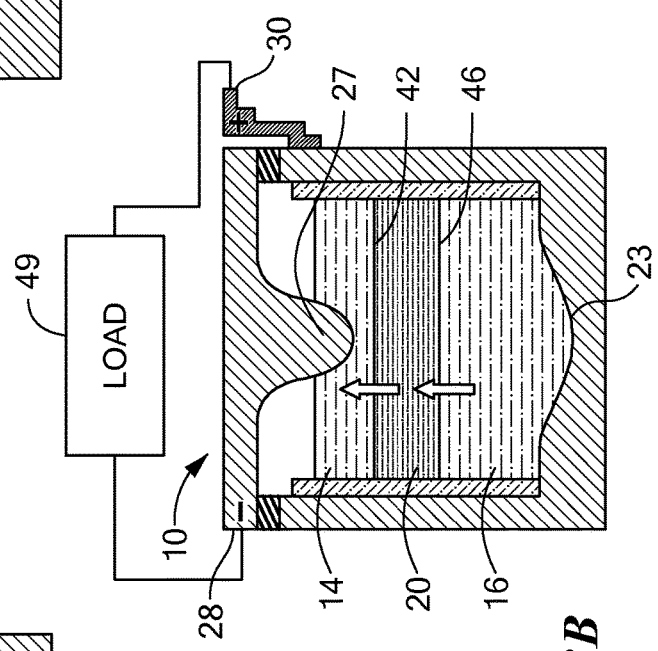
FIG. 3A   FIG. 3B   FIG. 3C

ALKALI METAL ION BATTERY WITH BIMETALLIC ELECTRODE

CROSS REFERENCE TO RELATED APPLICATIONS

The present application is a continuation of U.S. patent application Ser. No. 13/237,215 filed Sep. 20, 2011, now U.S. Pat. No. 9,000,713, which claims the benefit of U.S. Provisional Patent Application No. 61/384,564 filed on Sep. 20, 2010, the disclosures of which are incorporated by reference herein in their entirety.

STATEMENT REGARDING FEDERALLY SPONSORED RESEARCH OR DEVELOPMENT

This invention was made with government support under Grant No. DE-AR0000047 awarded by the Department of Energy. The U.S. government has certain rights in the invention.

TECHNICAL FIELD

The present invention relates to energy storage devices and, more particularly, the invention relates to electrochemical cells that, during charging and discharging, function with liquid metals and electrolytes.

BACKGROUND

Balancing supply and demand of electrical energy over time and location is a longstanding problem in an array of applications, from commercial generator to consumer. The supply-demand mismatch causes systemic strain that reduces the dependability of the supply, inconveniencing consumers and causing loss of revenue. Since most electrical energy generation in the United States relies on the combustion of fossil fuels, suboptimal management of electrical energy also contributes to excessive emissions of pollutants and greenhouse gases. Renewable energy sources like wind and solar power may also be out of sync with demand since they are active only intermittently. This mismatch limits the scale of their deployment. Large-scale energy storage may be used to support commercial electrical energy management by mitigating supply-demand mismatch for both conventional and renewable power sources.

One approach to energy storage is based on electrochemistry. Conventional lead-acid batteries, the least expensive commercial battery technology on the market, have long been used for large-scale electrochemical energy storage. Facilities housing vast arrays of lead-acid cells have delivered high-capacity electricity storage, such as on the order of 10 MW. However, these facilities are neither compact nor flexibly located. Moreover, the short cycle life of lead-acid batteries, which typically is on the order of several hundred charge-discharge cycles, limits their performance in uses involving frequent activation over a wide voltage range, such as daily power management. This type of battery also does not respond well to fast or deep charging or discharging, which lowers their efficiency and reduces their lifespan.

Sodium-sulfur ("NAS") batteries have been adapted to large-scale power management facilities in the United States and Japan. An NAS battery incorporates opposed molten sodium and sulfur electrodes across a solid ceramic electrolyte. To maximize sodium ion conduction, this solid ceramic electrolyte must be very thin. This thin profile, however, comes with a tradeoff—it makes the electrolyte mechanically fragile and imposes severe limits on the maximum size of an individual cell. This, in turn, affects scalability, i.e., large capacity must be achieved through many small cells rather than through few large cells, which significantly increases complexity and ultimately increases the cost of the system. Cell construction further is complication by the violent reaction of sodium with water, and rapid oxidation of sodium in air.

SUMMARY OF VARIOUS EMBODIMENTS

In a first embodiment of the invention, an electrochemical cell has three distinct phases. The first phase defines a positive electrode having two elements other than an alkali metal. The second phase includes cations of the alkali metal, and defines two separate interfaces. The first phase is in contact with the second phase at one of the interfaces. The third phase defines a negative electrode and includes the alkali metal. It is separate from the first phase and in contact with the second phase at the other interface. The first and third phases have respective volumes which decrease or increase at the expense of one another during operation of the cell. As a result the second phase is displaced from a first position to a second position. In first, second and third phases may be solid, liquid, or in a combination of solid or liquid states. In preferred embodiments, the alkali metal is present at respective disparate chemical potentials in the first and third phases, originating a voltage between the first and third phases.

Another embodiment includes an electrochemical cell having two distinct phases. The first phase defines a positive electrode and includes an alkali metal, and two other elements other than the alkali metal. The second liquid phase includes cations of the alkali metal, and defines two separate interfaces. The first phase is in contact with the second phase at one of the interfaces. In some embodiments, the first, second and third phases are solid. In other embodiments, the first, second and third phases are liquid. In other embodiments, the phases are in a combination of solid or liquid states. The alkali metal preferably is selected to exhibit a change in chemical potential when combined with the first and second elements. During operation of the cell to deliver or draw electrical energy to drive transfer of the alkali metal to or from the second liquid phase to or from the first liquid phase, the first phase has a volume which increases or decreases thus transferring energy to or from the electrochemical cell to or from an external circuit. As a result the second phase is displaced from a first position to a second position.

In various embodiments, the two elements other than the alkali metal are independently selected from group IVA, VA and VIA elements of the chemical periodic table. In preferred embodiments, these elements are selected independently from one of tin, lead, bismuth, antimony, tellurium and selenium. In other preferred embodiments, these elements are lead and antimony. The alkali metal may be sodium or lithium. The second phase may include refractory particles distributed throughout the second liquid phase. Moreover, the refractory particles may include a metal oxide.

The second phase can include a salt of the alkali metal. The salt of the alkali metal may be selected from one or more of halide, bistriflimide, fluorosulfano-amine, perchlorate, hexaflourophosphate, tetrafluoroborate, carbonate or hydroxide.

In certain embodiments, the electrochemical cell includes three phases that each have a different density from the others. Accordingly, the first phase has a first density, the second phase has a second density lower than the first density, and the third phase has a third density lower than the second density. Similarly, in other embodiments, the electrochemical cell includes two phases having a different density from the other. The first phase thus has a first density, and the second phase has a second density lower than the first density.

In certain embodiments, the electrochemical cell is configured to exchange electrical energy with an external device. For example, the external device may be an energy source or an energy load. The electrochemical cell also may include a container holding the three phases, an electrical pole electrically connected to the first phase, and another electrical pole electrically connected to the third phase.

Among others, the electrochemical cell has a total capacity of less than about 30 kWh. In other embodiments, the electrochemical cell has a total capacity of more than about 30 kWh.

In accordance with other embodiments, a battery includes two or more electrochemical cells similar to those discussed above. In other embodiments, a system includes a plurality of batteries, similar to those discussed above, electrically connected in series. Alternatively, the system may include a plurality of those batteries electrically connected in parallel, or, a plurality of the noted batteries electrically connected in series and in parallel.

In other embodiments, a method stores electrical energy transferred from an external circuit. To that end, the method provides at least one electrochemical cell having three liquid phases. The first liquid phase defines a positive electrode and includes two elements other than an alkali metal. The second liquid phase includes cations of the alkali metal, and defines two separate interfaces. The first phase is in contact with the second phase at one of the interfaces. The third liquid phase defines a negative electrode and includes the alkali metal. It is separate from the first phase and in contact with the second phase at the other interface. The electrochemical cell is configured to connect with the external circuit. The external circuit is electrically connected to a negative pole and a positive pole of electrochemical cell. The external circuit is operated drive electrical energy that drives transfer of the alkali metal to or from the first liquid phase, through the second liquid phase, and to or from the third liquid phase. The first phase has a volume which decreases or increases while the third phase has a volume which decreases or increases respectively thus transferring energy to and from the external circuit to the electrochemical cell. As a result the second phase is displaced from a first position to a second position.

In other embodiments, a method releases electrical energy from the electrochemical cell to an external circuit. The method includes providing at least one electrochemical cell having three liquid phases. The first liquid phase defines a positive electrode and includes two elements other than an alkali metal. The second liquid phase includes cations of the alkali metal, and defines two separate interfaces. The first phase is in contact with the second phase at one of the interfaces. The third liquid phase defines a negative electrode and includes the alkali metal. It is separate from the first phase and in contact with the second phase at the other interface. The electrochemical cell is configured to connect sequentially with external circuits. The external circuits are electrically connected to a negative pole and a positive pole of electrochemical cell. The external circuits are sequentially operated to drive electrical energy to drive transfer of the alkali metal to or from the third liquid phase, through the second liquid phase, and to or from the first liquid phase, the first phase has a volume which increases or decreases while the third phase has a volume which decreases or increases respectively thus transferring energy to or from the electrochemical cell to or from the external circuits. As a result the second phase is displaced from a first position to a second position.

In other embodiments, another method stores electrical energy transferred from an external circuit. This method provides at least one electrochemical cell having two liquid phases. The first liquid phase defines a positive electrode and includes two elements other than an alkali metal. The second liquid phase includes cations of the alkali metal, and defines two separate interfaces. The first phase is in contact with the second phase at one of the interfaces. The electrochemical cell is configured to connect with the external circuit. The external circuit is electrically connected to a negative pole and a positive pole of electrochemical cell. The external circuit is operated drive electrical energy to drive transfer of the alkali metal to or from the first liquid phase, through the second liquid phase. The first phase has a volume which decreases or increases during the operation of the cell thus transferring energy to or from the external circuit to the electrochemical cell. As a result the second phase is displaced from a first position to a second position.

In some embodiments, the method includes an electrochemical cell connected to one or more of an electric power plant, a power transmission line, or an external circuit that delivers energy converted from a renewable energy source. In some embodiments, the method includes an electrochemical cell that is part of a system to provide an uninterruptible power supply.

The method includes an electrochemical cell in which the alkali metal is sodium or lithium. In some embodiments, the method includes an electrochemical cell in which the second liquid phase includes refractory particles distributed throughout the second liquid phase. Among other things, the method may include an electrochemical cell in which the second phase includes a halide salt of the alkali metal.

BRIEF DESCRIPTION OF THE DRAWINGS

The foregoing features of embodiments will be more readily understood by reference to the following detailed description, taken with reference to the accompanying drawings, in which:

FIGS. 2A-2C are vertical sections illustrating the charging process of an alkali metal-ion energy storage electrochemical cell constructed in accordance with the invention, 2A when the cell is discharged, 3B the cell is in operation and connected to a source of energy (charging circuit), and 3C the cell is charged;

FIGS. 3A-3C are vertical sections illustrating the discharging process of an alkali metal-ion energy storage cell constructed in accordance with the invention, 3A when the cell is charged, 3B the cell is in operation and connected to a load, and 3C the cell is discharged.

The figures are not, in general, drawn to scale, and generally are schematic in nature.

DESCRIPTION OF ILLUSTRATIVE EMBODIMENTS

In illustrative embodiments, a device (e.g., a battery) has a positive electrode with two elements that are not alkali metals, and a negative electrode having an alkali metal component. These electrodes cooperate to efficiently store and deliver energy across an electrolyte. Although these electrodes and the electrolyte preferably are in a liquid phase, some embodiments maintain them in a solid phase. Details of various embodiments are discussed below.

Figure 1:
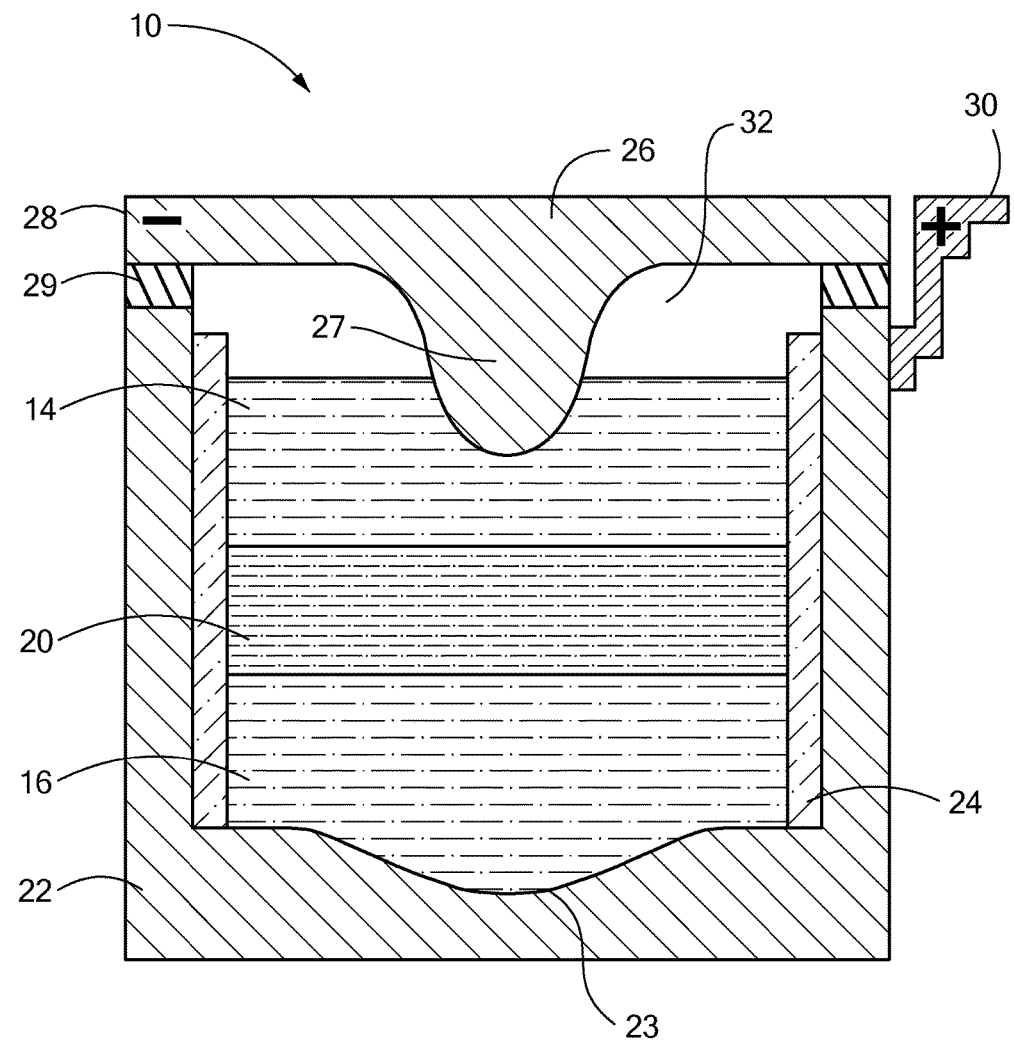
FIG. 1 is a vertical section showing a self-assembling alkali metal-ion energy storage electrochemical cell constructed in accordance with the invention.

As used herein, the term "battery" may encompass individual electrochemical cells or cell units having a positive electrode, a negative electrode, and an electrolyte, as well as configurations having an array of electrochemical cells. FIG. 1 shows an alkali metal ion energy storage cell, indicated generally at 10, configured in accordance with illustrative embodiments of the invention. The cell 10 has three distinct constituents: a molten metal body 14 that serves as negative electrode, also referred to as the active metal electrode; an electrically conductive multi-elemental liquid body 16 that serves as positive electrode; and an intervening ionically conductive electrolyte 20.

The electrically conductive layers 14, 16 and 20 are confined in a container 22 that illustratively is electrically conductive and mechanically supports an insulating inner sheath 24. The sheath 24 prevents shorting by electric conduction between the negative electrode 14 and the positive electrode 16 through the container 22. The container 22 is covered by a lid 26 which is illustratively electrically conductive. An electrically insulating seal 29 electrically isolates the lid 26 from the container 22 to confine molten constituents and vapors within the container 22. The portion of the lid 26 in contact with the negative electrode 14 functions as a negative current collector 27, through which electrons may pass to an external source or sink (not shown) by way of a negative terminal 28 that is in contact with the lid 26.

The portion of the container 22 in contact with the positive electrode 16 functions as the positive current collector 23, through which electrons may pass to the external source or load by way of a positive terminal 30 connected to the container 22. The negative terminal 28 and the positive terminal 30 are oriented to facilitate arranging individual cell units in series by connecting the negative terminal 28 of one cell unit to the positive terminal 30 of another cell unit 10 to form a battery.

The cell 10 also has an inert gas layer 32 overlaying the negative electrode 14 to accommodate global volume changes in the three-phase system produced by 1) charging and discharging, or 2) temperature changes. Optionally, the lid 26 or seal 29 incorporates a safety pressure valve (not shown).

The container 22 and the lid 26 are each formed from material having the requisite electric conductivity, mechanical strength, and resistance to chemical attack by the liquid electrodes 14 and 16 and electrolyte 20. For some chemistries, mild steel may be a suitable material for the container 22 and the lid 26. The sheath 24 may be formed from an electrically insulating material and should be corrosion-resistant against the two liquid electrodes 14 and 16 and the electrolyte 20. For some chemistries, boron nitride, aluminum nitride, alumina, and magnesia may be appropriate materials for the sheath 24. The seal 29 may be formed of one or more materials, such as magnesia cement, aluminoborate glasses, and other high temperature sealants as known to those skilled in the art. Those skilled in the art can construct the container 22 and other noted components in a conventional manner as required by the application, which includes consideration of the electrode and electrolyte chemistries.

In illustrative embodiments, the electrodes 14 and 16 and electrolyte 20 are constituted to establish chemical and physical properties compatible with simplicity and economy of construction, robustness, and rapid and efficient receipt and delivery of electrical energy. Accordingly, as noted above, the chemical compositions of the molten electrodes 14 and 16 are formulated conjunctionally to incorporate an active alkali metal, such as lithium, sodium, potassium, rubidium or cesium at respective disparate thermodynamic activities, consequently generating a voltage between the electrodes 14 and 16.

To create thermodynamic disparity of the active alkali metal between the negative 14 and positive 16 electrodes, at least one of the electrodes 14 and 16 includes one or more additional elements, other than the alkali metal. Any such additional element may be, for example, miscible in the liquid composition of the electrode 14 or 16 to form an alloy with the alkali metal, or exist in a compound with the alkali metal under the operating conditions. Preferably, the additional elements are chosen such that the alloy melts at temperature lower than 600° C. The one or more additional elements are chosen to constitute the positive electrode 16 as an environment of relatively low thermodynamic activity of the active alkali metal, compared to the negative electrode 14, when the cell 10 is in a charged state. The positive electrode 16 may be a liquid-phase solution, conventionally referred to as an alloy of the active alkali metal. Alternatively, the positive electrode 16 may include a liquid-phase compound of the active alkali metal, and one or more other elements.

Alloying the positive electrode metal with metals of lower electronegativity can lower the melting point of the liquid metal alloy (i.e. antimony melts at 631° C., while the lead-antimony eutectic alloy melts at 253° C.). This, in turn, allows the cells to operate at a lower temperature and/or operate more efficiently. Lowering the melting point of the cathode materials can also increase the solubility limit of the alkali metal in the cathode, which represents an increase in capacity of the cathode and decrease the cost per energy storage capacity of the cell. Furthermore, a cell operating at a lower temperature should experience less corrosion and potentially extended operating lifespan of the cell.

Numerous factors are important when choosing additional elements for the electrodes 14 and 16. For example, those factors include among other things, the chemical equilibrium and solution thermodynamics in the electrodes 14 and 16, their interactions with the electrolyte 20, their relative densities, melting points and boiling points. It is preferred to select elements that create alloys with low melting point and a high boiling point. Any of those additional elements in the electrodes 14 or 16 ideally should not interact with the ions in the electrolyte in a way that would provide a competing pathway for charge transport and circumvent the prescribed electrode reactions.

As noted, the positive electrode 16 includes at least two additional elements besides the alkali metal. Accordingly, the positive electrode 16 is multi-elemental at all times during the discharging and charging sequence described below. The positive electrode 16 of binary or higher order composition may have physical properties that allow the cell 10 to operate at a lower temperature compared to what would be possible with an electrode comprising only one additional element. Elements that may be appropriate for incorporation in the positive electrode 16 include one or more elements of Group IIIA, IVA, VA and VIA of the periodic table of the elements, such as aluminum, gallium, indium, silicon, germanium, tin, lead, pnicogens such as arsenic, bismuth and antimony, and chalcogens such as tellurium and selenium. Each of the one or more additional elements may be present at a concentration of at least 5%, 10%, 25% or more in the positive electrode 16.

The electrodes 14 and 16 may include other species, for example, to tailor physical properties or enable electrochemical monitoring of the extent of discharge, as is known to those skilled in the art. For example, one or more transition metals or metalloids, such as copper, silicon, iron, or gallium, may be added in smaller quantities to adjust the density and/or melting point.

The electrolyte 20 of the cell 10 may be a liquid incorporating a salt of the active alkali metal, referred to herein as the active cation, and one or more supporting compounds. In one embodiment, the electrolyte 20 may further incorporate one or more constituents forming a paste with the other electrolyte constituents. For example, the electrolyte 20 may include filler particles of a refractory compound, such as alumina or magnesia, held in the electrolyte by capillary forces exerted by the molten salt. The filler may act as a thickening agent, facilitating use in the cell 10 of a liquid, such as a molten salt, of high fluidity in the electrolyte 20, thus affording relatively high current densities for a given cell voltage. A paste formulation of the electrolyte 20 may also reduce solubility of the active alkali metal therein, improving efficiency of the cell 10. The cell 10 may incorporate a structural member (not shown), such as mesh body, to hold the electrolyte 20 constituted as a paste in place between the electrodes 14 and 16.

In some embodiments, the active alkali metal salt is a halide, such as a chloride, of the active alkali metal. Alternatively, the salt of the active alkali metal may be, for example, a non-chloride halide, bistriflimide, fluorosulfanoamine, perchlorate, hexaflourophosphate, tetrafluoroborate, carbonate or hydroxide. A supporting compound is typically added to enhance ionic conductivity, and/or to inhibit electric conductivity through the electrolyte. The supporting electrolyte may include an anion, for example, a halide, bistriflimide, fluorosulfano-amine, perchlorate, hexaflourophosphate, tetrafluoroborate, carbonate or hydroxide and a cation such as an alkali or alkaline-earth metal, an imide, amine, ammonium, phosphonium or pyrrolidinium. Those skilled in the art should appreciate that ions in the electrolyte 20 may be in complexed states.

Other additives to the electrolyte 20 may reduce the viscosity, depress the melting point, alter the density, reduce vapor pressure, or introduce complexing ligands, which reduce the solubility of the neutral active alkali metal in the electrolyte 20 to minimize current leakage or self-discharge. The supporting electrolyte and any other additives may have free energies of formation sufficiently negative to limit the electrode reactions to the oxidation and reduction of the active alkali metal. These and other considerations informing the choice of electrolyte composition are known to those skilled in the art.

In one embodiment, the compositions of the electrode 14 and 16 and electrolyte 20 may be formulated so that all-liquid operation may be reached at relatively low temperatures, such as lower than about, for example, 500° C. or 400° C. Operation at relatively low temperatures may reduce the solubility of metallic sodium in the electrolyte 20. Difficulties such as volatilization of cell constituents, structural weakness, chemical attack of ancillary materials, and power required to maintain liquidity of the electrodes 14 and 16 and electrolyte 20 are expected to become more manageable as operating temperature decreases, reducing the cost of operating the cell 10.

The electrodes 14 and 16 and the electrolyte 20 may be further formulated so that their densities are ordered in accordance with their functions in the cell 10. Various embodiments having respective densities increasing, as shown in FIG. 1, or decreasing in the order negative electrode 14/electrolyte 20/positive electrode 16 may spontaneously self-assemble into the illustrated vertically stacked, layered structure upon melting, providing for simpler manufacture from billets.

Energy storage in the alkali metal ion cell 10 is not limited to any particular method of attaining or maintaining the operating temperature thereof. The constituents forming any of the liquid phases 14, 16, and 20 may be melted in a separate heated chamber with sufficient superheat to allow transfer to the container 22. In another approach, external heaters (not shown) placed, for example, within the wall of the container 22 may be used before or during operation. Alternatively, the cell 10 may be self-heating during operation through applied overpotentials. Techniques for achieving and managing temperature profiles in molten constituents, and other practical aspects of electrometallurgical systems potentially helpful to implementing power storage using liquid alkali metal electrodes, such as construction of apparatus for use with molten salts and liquid metals, are known to those skilled in the art and have been described, for example, in commonly owned pending U.S. Application Ser. No. 11/839,413, filed Aug. 15, 2007, Ser. No. 12/505,937, filed Jul. 20, 2009, Ser. No. 12/839,130, filed Jul. 19, 2010 and in U.S. Pat. Nos. 4,999,097 and 5,185,068, the entire disclosures of all of which are incorporated herein by reference.

The cell 10 may incorporate a circulation producer configured to generate circulation within one or more of the respective layers constituting the negative electrode 14, positive electrode 16 and, in the case of a liquid electrolyte, the electrolyte 20 as described in U.S. application Ser. No. 12/839,130, earlier incorporated by reference. The circulation generated induces a flow of liquid material of one or more of the layers to and from one or both of the respective interfaces between the electrolyte 20 and an electrode 14 or 16.

The illustrative alkali metal ion cell 10 receives or delivers energy by transporting an alkali metal, referred to herein as the active alkali metal, between the two electrically conductive molten electrodes 14 and 16 via an electrochemical pathway. The liquid electrolyte 20 comprising a cation of the active alkali metal enables ionic transport of the active alkali metal during charging or discharging.

An electrochemical cell of the invention is preferably constructed in a fully discharged state by first melting the ternary alloy of the alkali metal and the two other elements as the cathode. The electrolyte is then added. The negative electrode current collector is then installed, and the cell is heated to the operating temperature inside an argon filled test vessel.

FIGS. 2A-2C illustrate the function of the cell 10 during charging. FIG. 2A shows the cell 10 in an uncharged or discharged state. Before charging, the positive electrode 16 contains atoms of the active alkali metal. The negative electrode 14 meets the electrolyte 20 at an active metal-electrolyte interface 42. In a corresponding manner, the positive electrode 16 meets the electrolyte 20 at a separate alloy-electrolyte interface 46. As shown and discussed below, these interfaces move during charging and discharging, while maintaining the general volume of the electrolyte, while the volumes of the positive and negative electrodes increase or decrease at the expense of one another. In other words, the positive electrode 16 has a volume that increases or decreases in correlation to a respective decrease or increase of the volume of the negative electrode 14.

Specifically, FIG. 2B shows the charging process. To initiate charging, the terminals 28 and 30 are connected to an external charging circuit 48, which drives the active alkali metal from the positive electrode 16, through the electrolyte 20 to neutral metal at a higher chemical potential in the negative electrode 14. During charging, electron current travels from the external circuit, through the negative current collector 27, into the negative electrode 14, and to the active metal-electrolyte interface 42. Active cations $M^+$ move across the electrolyte 20 toward the active metal-electrolyte interface 42. The active cations and the electrons meet at the interface 42 and are consumed in the reduction half-cell reaction $M^+ + e^- \rightarrow M$. The neutral active alkali metal atoms M created in the half-cell reaction accrue to the negative electrode 14. As the active alkali metal M accumulates in the negative electrode 14, the active metal-electrolyte interface 42 moves further away from the negative current collector 27. At the alloy-electrolyte interface 46, atoms of the active alkali metal M in the positive electrode are oxidized in the half-cell reaction $M \rightarrow M^+ + e^-$. As active cations $M^+$ enter the electrolyte 20, electrons are freed to pass through the positive current collector 23 to the external charging circuit 48. Oxidation of the active alkali metal atoms M shrinks the positive electrode 16, and the alloy-electrolyte interface 46 moves toward the positive current collector 23.

FIG. 2C shows the cell 10 in its final charged state. Charging has changed the composition of at least the positive electrode 16 by loss of atoms of the active alkali metal. In fact, in some embodiments, the positive electrode 16 may be nominally free of the active alkali metal at this point in the charge-discharge cycle. The thickness of the negative electrode 14 has grown at the expense of the positive electrode 16. Since the charging process is conservative with respect to the active cations, the thickness of the electrolyte 20 is in principle unchanged.

The active alkali metal deposited in the molten active metal electrode 14 represents stored electrical energy which may persist substantially indefinitely, as long as no external electric path joins the two electrodes 14 and 16. The half-cell reactions in the cell 10 generate liquid-phase products that remain at the electrodes 14 and 16, and in contact with the electrolyte. While the electrodes 14 and 16 and electrolyte 20 remain in their liquid state, the active alkali metal and the active cation are available to mechanize charge and discharge via an electrochemical pathway. This reversibility renders the active alkali metal ion cell suitable to use in batteries for energy storage.

FIGS. 3A-3C illustrate discharging the cell 10. FIG. 3A shows the cell 10 in a charged state, while FIG. 3B shows the cell terminals 28 and 30 connected to an external load 49, which initiates discharge. During discharge the active alkali metal moves spontaneously from the negative electrode 14, through the electrolyte 20 as active cations, and reverts to neutral metal at a lower chemical potential in the positive electrode 16. Electron current travels into the cell through the positive current collector 23 and the positive electrode 16, to the alloy-electrolyte interface 46. Active cations $M^+$ migrate across the electrolyte 20 toward the alloy-electrolyte interface 46. Active cations $M^+$ and electrons are consumed at the interface 46 in the reduction half-cell reaction $M^+ + e^- \rightarrow M$. The neutral active alkali metal atoms M produced accrue to the positive electrode 16. As the active alkali metal M accumulates in the negative electrode 16, the alloy-electrolyte interface 46 moves further away from the positive current collector 23. At the active metal-electrolyte interface 42, atoms of the active alkali metal M in the negative electrode 16 are oxidized in the half-cell reaction $M \rightarrow M^+ + e^-$. The active cations $M^+$ produced enter the electrolyte 20, and the freed electrons pass through the negative current collector 27 to the external load 49. Oxidation of the active alkali metal atoms causes attrition of the negative electrode 14, with movement of the active metal-electrolyte interface 42 toward the negative current collector 27.

FIG. 3C shows the cell 10 in its final discharged state. Charging has changed the composition of at least the positive electrode 16 due to accretion of active alkali metal atoms. The thickness of the positive electrode 16 has grown at the expense of the negative electrode 14. Since the discharging process is conservative with respect to the active alkali metal cations, ideally the thickness of the electrolyte 20 is unchanged.

The charge and discharge sequences of FIGS. 2A-2C and 3A-3C represent anticipated examples of the cell 10 during use. In alternative embodiments, when fully discharged, the entire negative electrode 14 may be completely used—the entire liquid mass making up the negative electrode 14 migrated to the positive electrode 16. This is in contrast to the embodiments shown in FIGS. 2A-2C and 3A-3C. Moreover, some embodiments may implement the cell 10 with solid phase electrodes 14 and 16, and/or a solid phase electrolyte 20. Solid phase electrodes may be favorable for shipping of the cell 10.

The substantially constant thickness of the electrolyte layer throughout the charge-discharge cycles enables the use of an electrolyte layer that is relatively thin compared to those of the electrodes. The thin electrolyte layer, combined with the inherently low resistivity of molten halides, may minimize the ohmic overpotential associated with the electrolyte. The energy capacity of the cell 10 may be limited by the smaller of the respective quantities of active alkali metal that can be accommodated by the negative electrode 14 and by the positive electrode 16. The energy capacity can be augmented by scaling up the quantity of material in the electrodes 14 and 16 without, in principle, increasing the mass of the electrolyte 20 or its associated IR drop. For example, the thickness of the electrolyte 20 may be on the order of only 10%, 20% or 50% of the thickness of either of the electrodes 14 and 16.

It has been observed that in some instances, the electrolyte more readily wets the bottom of the container than does a molten metal, such as the alloy of the positive electrode. This wetting undesirably blocks electric conduction between the positive electrode and the container. Thus, in some instances it may be desirable to introduce a plug of a material, such as another of a metal, by compression fit in the bottom of the container 22, that functions as the positive current collector 23. The alloy of the positive electrode 16 preferably has a greater wettability than the electrolyte 20, and thus secures an electrically conductive pathway between the molten positive electrode 16 and the positive terminal 30.

Figure 4:
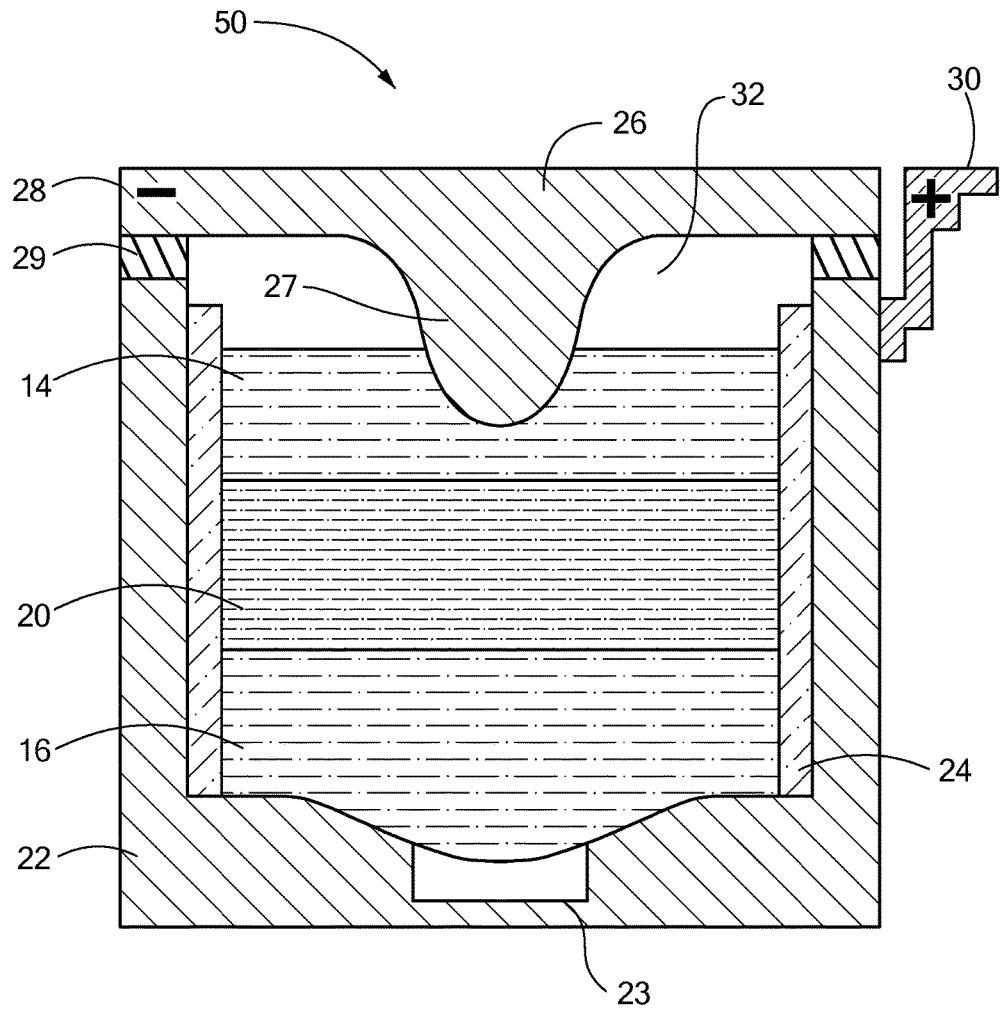
FIG. 4 is a vertical section showing another embodiment of the alkali metal-ion energy storage cell constructed in accordance with the invention.

An alternative embodiment eliminates the expense and complexity of electrically insulating the interior surface of the container 22 as shown for the cell 10 (FIG. 1) and battery 50 (FIG. 4). To that end, the current collector 27 contacts the negative electrode such that the negative electrode has a geometry that does not come in physical contact with the container 22, while allowing contact only with the current collector 27 and the electrolyte 20.

In another alternative embodiment, the alkali metal ion energy storage cell is configured for enhanced robustness by impeding mixing of the two electrically conductive liquids of the electrodes 14 and 16 during shaking or tipping of the container 22. Such features for liquid electrodes are discussed in commonly owned pending U.S. application Ser. Nos. 12/505,937, and 12/839,130, earlier incorporated herein by reference.

The alkali metal ion cell 10 (FIG. 1) or 50 (FIG. 4) may be capable of rapidly receiving and dispatching electricity, thus bridging a supply-demand mismatch. The energy-storage cells may operate at extreme temperatures, such as arctic cold and desert heat, without restriction on geographical location and are realizable in a mobile structure.

The power capacity may be large, e.g., on the order of one MW per ten square, and scalable for adaptation from a variety of medium scale capacity for use in residential applications to a variety of large-scale capacity in industrial and power management applications. Several approaches are possible in expanding the capacity of the alkali metal ion energy storage cell to adapt it to the requirements of large-scale applications, on the order of several megawatts (MW). In one approach, scalability may be exploited in a single large alkali metal ion energy storage cell by increasing the mass of the electrodes 14 and 16 and thus, increasing the mass of alkali metal available for transfer within the cell. In another approach, a battery including many smaller alkali metal ion cells connected in series may confer a higher battery voltage more practically integrated with the power electrics necessary to serve large-scale systems. In yet another approach an array of cells may be interconnected in series and parallel connections for increased robustness with respect to failure due to individual cell malfunction.

One potential use for the alkali metal ion energy storage cell is at a large-scale power generator. The diurnal fluctuation in energy demand reduces plant efficiency, consequently increasing emissions by preventing generator operation at optimum output levels around the clock. A high-capacity electrical energy storage apparatus, with a power capacity greater than 1 MW, could allow load-leveling, which is effected by downloading power from the generator to a storage device during low-demand periods, and then uploading power to the grid during times of higher demand, permitting the power plant to operate at a more constant level—with fewer power spikes.

A second potential use for the alkali metal ion energy storage cell is at renewable energy source converters. Variability in supply makes management of power generated by renewable sources challenging. Sources such as wind and solar energy generate only intermittently. Without adequate power storage, additional power generators are needed on standby to operate in the event that the wind stops blowing, or the sky clouds over. The underutilized capital in the form of excess power generators ultimately may limit the scale of deployment of renewable energy sources. A reliable, high-capacity electrical storage device, used in conjunction with a renewable energy source, should provide dedicated load leveling, thus supporting implementation of renewable energy sources on the grid. Such a combination should also support the use of intermittent renewable energy sources as an alternative to generators in remote, off-grid locations, e.g., locations where periodic delivery of fuel may be difficult.

A third potential use for the alkali metal ion energy storage cell is in support of transmission lines. Transmission and distribution systems generally have no storage capacity. The grid therefore must meet instantaneous demand. As the load on a transmission line approaches its capacity, it incurs heavy ohmic losses, which decrease its efficiency. Furthermore, the resulting resistive heating can melt system components and cause transmission line failure. Portable generators of the requisite power capacity (tens of MW) available to boost supply at the load center may be noisy, polluting, and require periodic refueling. Upgrading or replacing transmission lines as they reach capacity limits is very expensive, time consuming, and frequently meets with public opposition.

A re-locatable alkali metal ion energy storage unit located near a load center could supply a portion of the energy carried by the transmission line during peak hours of the day, thus mitigating load demands on the line. Ideally, the storage unit would provide a significant portion, for example, at least 2% to 20% of the line's capacity, which is typically on the order of 500 MW. Such a unit could defer the need for a transmission line upgrade. Alternatively, a portable alkali metal ion energy storage unit could be deployed to supply emergency power after a system failure, or to maintain power delivery during construction of new lines. The storage unit then can be relocated when no longer needed.

Distribution systems from load centers suffer similar problems, although at much lower loads, and could similarly be addressed using a portable power storage unit. Commercial and residential consumers requiring a constant supply of electricity are especially vulnerable to blackouts. Auxiliary generators are less than ideal for backup because they require time to reach full output levels. These consumers would benefit from backup power systems, or uninterruptible power systems ("UPS"), configured to provide electricity in the event of a grid-power failure. A charged alkali metal ion energy storage unit, configured to discharge when the power is interrupted, could meet that need. Finally, a facility that is sensitive to voltage irregularities can be adversely affected by brownouts or other inconsistencies in delivered power. A UPS in the form of a charged alkali metal ion energy storage unit, configured to discharge to eliminate deviations from the desired power level, could act as a buffer between the grid and the facility to ensure high power quality.

Many large-scale implementations are expected to have a capacity of greater than about 30 kWh. An alkali metal ion energy storage cell of capacity lower than 30 kWh may be implemented at a small commercial or residential level, where an energy source, such as solar panels or individual wind turbines, may be used to charge the cell. Such a system should provide a continuous source of electricity to sustain the energy needs of the commercial or residential facility. These types of cell systems may be used advantageously in remote locations, off the grid, where the import of electricity with power lines is exorbitant or not practicable. Of course, such systems may be used in various other environments, such as in an urban or suburban environment.

Alkali metal ion energy storage cells thus may achieve high current capability while using low-cost, abundant metal in the alloy compositions. Selection of the alkali metal, electrolyte, and alloy in various combinations discussed herein permits a self assembling cell and enables low-cost manufacturing.

EXAMPLES

Example 1

In one embodiment, referred to herein as a sodium-antimony-lead cell, the active alkali metal of the cell is sodium, which may contribute, e.g., greater than 60% or 80% of the weight of the negative electrode. The additional elements modifying the sodium activity in the positive electrode are antimony and lead. The electrolyte is based on, e.g., NaCl, KCl and LiCl, for which the eutectic composition melts at $T_m < 400°$ C. The preferred operating temperature of the cell may be about 400° C.

Figure 5:
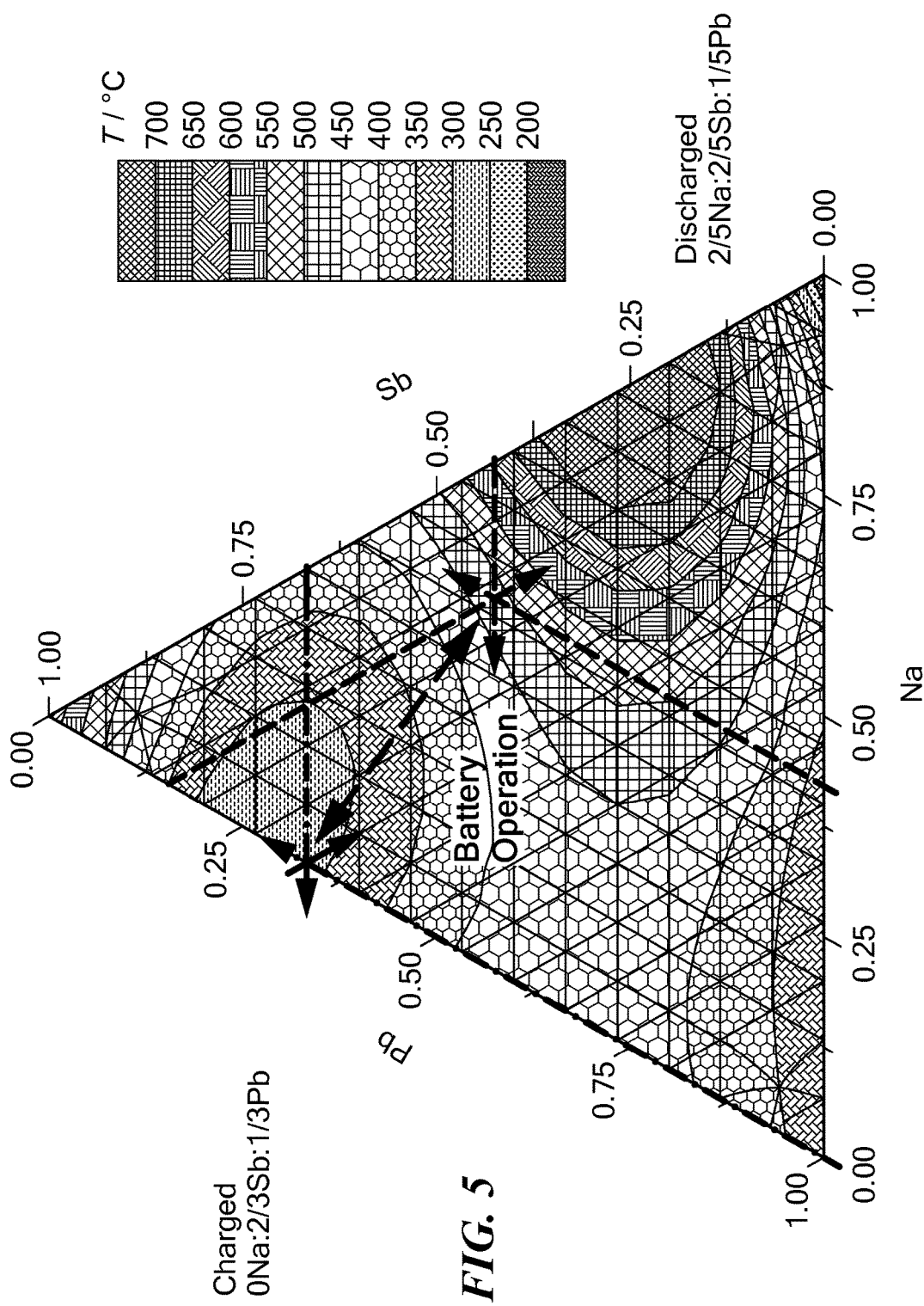
FIG. 5 is a temperature diagram of the melting points of binary (edges of the triangle) and ternary (inside the triangle) alloys of Na, Pb, and Sb.

In the charged state of the cell, the negative electrode may be commercially pure sodium, the positive electrode initially may be a bimetallic electrode constituted entirely of antimony and lead in a 1:1 atomic ratio; and the electrolyte may be a eutectic mixture of NaCl—KCl—LiCl mixed with aluminum oxide particles to constitute a paste. The proportions of sodium, antimony and lead may be selected according to the temperature diagram shown in FIG. 5 which shows the melting points of binary (edges of the triangle) and ternary (inside the triangle) alloys of Na, Pb, and Sb. As can be seen from FIG. 5, during operation of the electrochemical cell, the composition of the positive electrode varies, and so does the melting point of the alloy from the charged state (⅔ Sb: ⅓ Pb which melts in the 250-300° C. range) to the discharged state (⅖ Na: ⅖ Sb: ⅕ Pb which melts in the 450-500° C. range)

During discharge of the illustrative cell, an amount of sodium is transferred from the negative electrode to the positive electrode, equal on an atomic basis, to the amount of antimony in the positive electrode 16, so that the positive electrode has a terminal composition of sodium, antimony and lead in proportions of 2:2:1. The initial and terminal compositions are liquid at temperatures below 500° C., enabling low-temperature operation of the cell. Upon completion of discharging, the active metal electrode is reduced in mass and size compared to the charged state of the cell.

The open-circuit voltage of the sodium-antimony-lead cell fully charged may be on the order of 1 V. The actual open-circuit voltage of, e.g., the sodium-antimony-lead cell, is influenced by the activities of the active alkali metal in the electrodes, as expressed by the Nernst equation. The activities may exhibit large non-idealities that may shift the open-circuit voltage of the cell to values greater or less than its expected voltage. As the mass of the active alkali metal moves between the electrodes, changes in the respective chemical potentials change the open-circuit cell voltage, so that it may not be constant over the charge-discharge cycle.

Example 2

Figure 6:
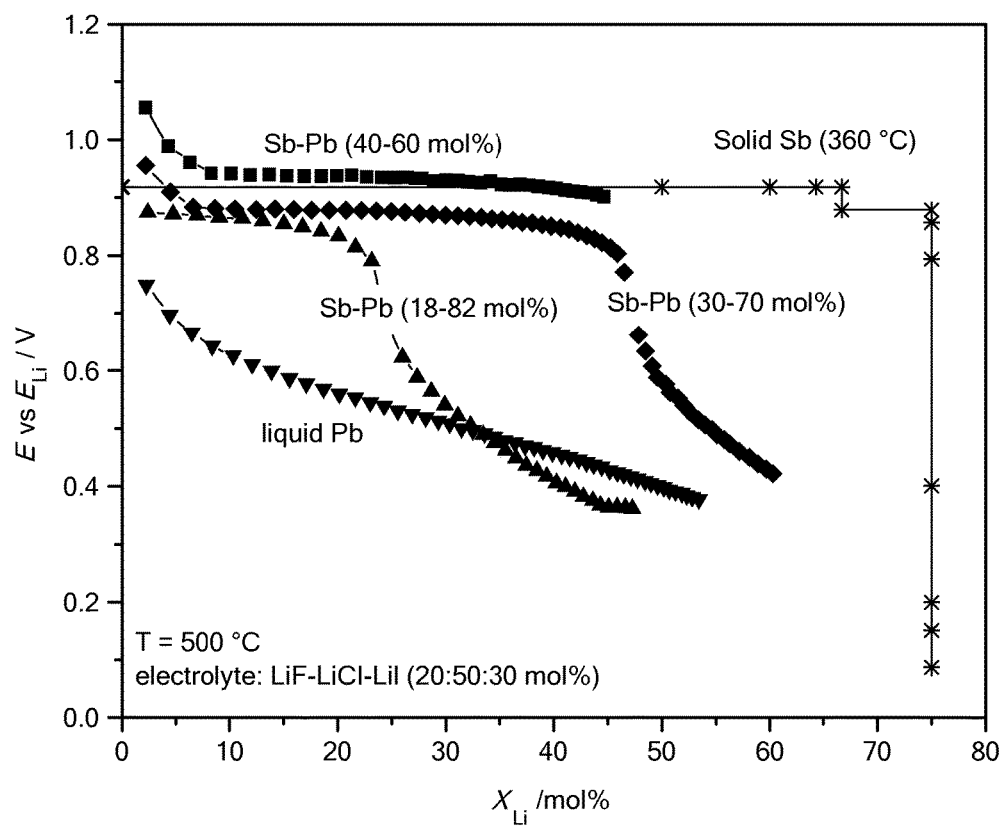
FIG. 6 is a plot of voltage at 500° C. of various Sb—Pb concentrations as a function of Li concentration.

Li metal was deposited into Sb—Pb alloys of various compositions (i.e. 40:60 mol %, 30:70 mol %, and 18:82 mol %). As the Li was deposited, the voltage was recorded between Li—Sb—Pb alloy and Li. A plot of voltage at 500° C. of various Sb—Pb concentrations as a function of Li concentration is shown in FIG. 6.

Surprisingly, we observed that the voltage of the 40-60 mol % Sb—Pb alloy vs. Li in the Li∥Sb—Pb cell (FIG. 6) measured at 500° C. was greater than that of pure Sb vs. Li in the Li∥Sb cell. We attributed these results to the entropic effect of depositing Li into solid antimony (melting point of 670° C.) compared to depositing Li into the Sb—Pb alloy, which is liquid at the operating temperature (melting point of 450° C.) (i.e., the entropy of mixing in a liquid contributes to the change in free energy of the reaction, which in turn, increases the cell voltage).

Figures 7A, 7B:
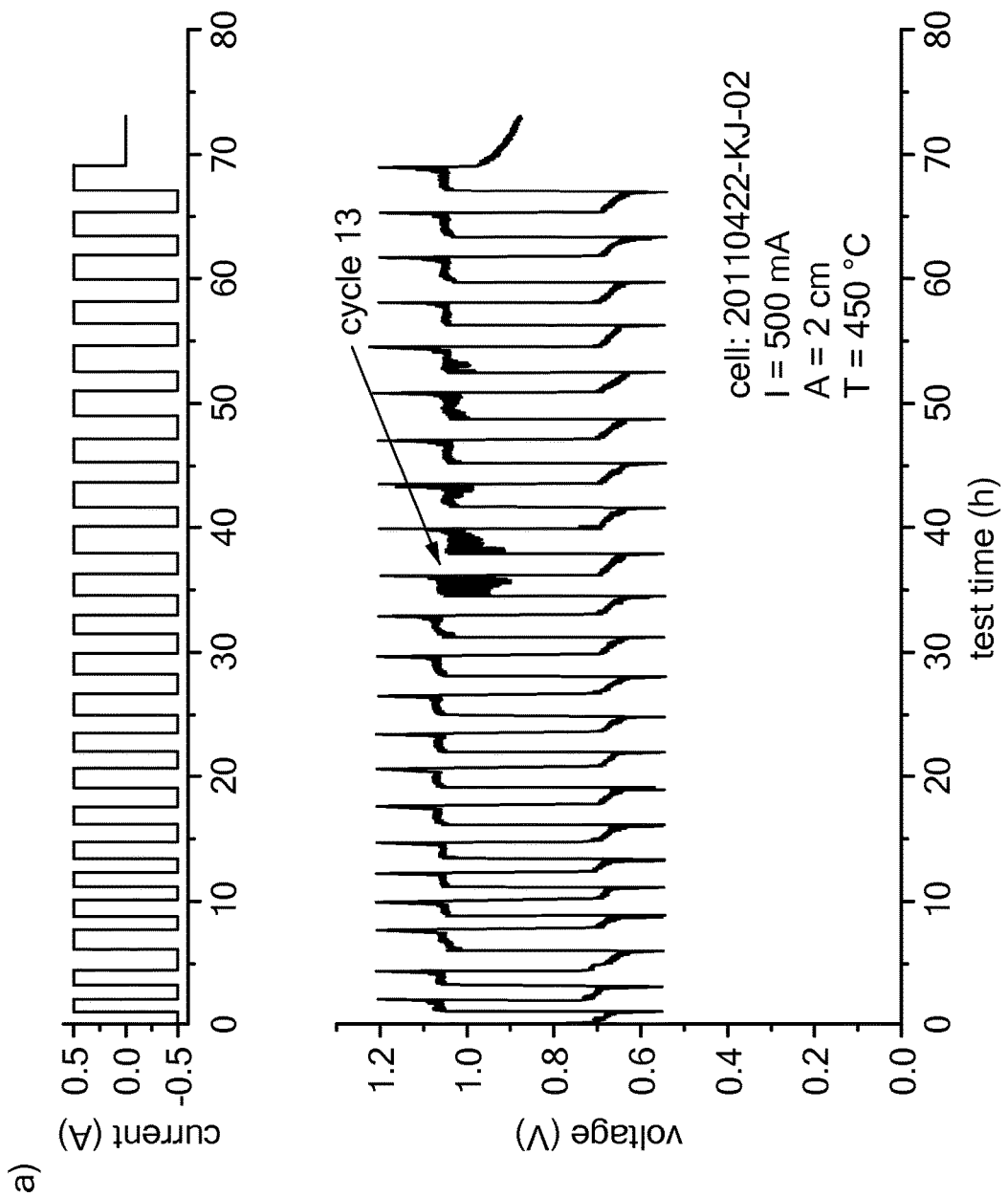
FIG. 7A is a plot of applied current over time of a Li∥Sb—Pb cell operated at 450° C., cycled at 250 mA/cm$^2$, and assembled with a 29 mol % Li ($Li_2Sb_2Pb_3$).
FIG. 7B is a plot of voltage response over time of a Li∥Sb—Pb cell operated at 450° C., cycled at 250 mA/cm$^2$, and assembled with a 29 mol % Li ($Li_2Sb_2Pb_3$).
Figure 8A:
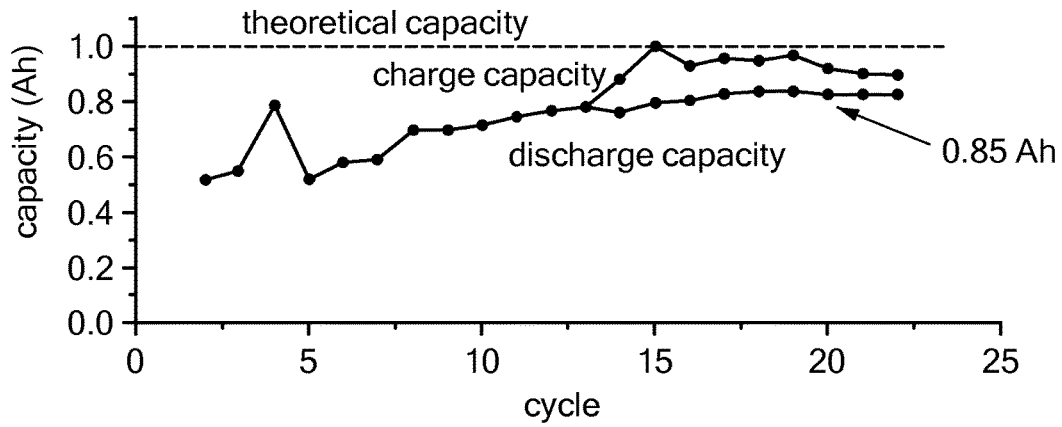
FIG. 8A is a plot of the of a Li∥Sb—Pb cell capacity over the number of charge and discharge cycles
Figure 8B:
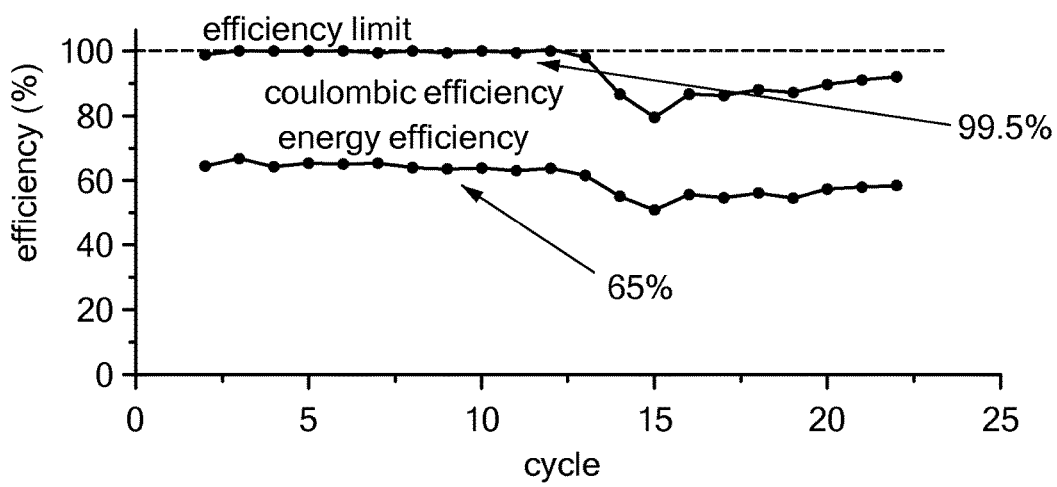
FIG. 8B is a plot of efficiency of a Li∥Sb—Pb cell over the number of charge and discharge cycles.

Li∥Sb—Pb cells of various Sb—Pb molar ratios were constructed and successfully operated. Cells were constructed in a fully discharged state with pre-melted Li—Sb—Pb as the cathode. The electrolyte was added LiF—LiCl—LiI, the negative electrode current collector was installed, and cells were heated to the operating temperature inside an argon filled test vessel. The cells exhibited open circuit voltages of 0.88 V, consistent with results from the titration experiments. The cells were successfully cycled at a high current density (250 mA/cm$^2$) (see FIGS. 7A and 7B and 8A and 8B) exhibiting high coulombic efficiency, and high utilization of Li. Some cells were assembled with a metal alloy of composition of Li$_2$Sb$_2$Pb$_3$ (29 mol % Li) and maintained a high cell voltage (0.88 V open circuit voltage) throughout the duration of the discharge portion of the cycle. The cells exhibited a charging voltage of 1.06 V and a discharge voltage of 0.68 V (FIG. 7B). These voltages were different than the open circuit (zero current) voltage of 0.88 V due to IR over-potentials experienced when current flows. As seen in FIGS. 8A and 8B, the theoretical capacity (based on the amount of Li in the alloy) was 1 Ah, and the cell successfully cycled with capacities of 0.85 Ah, demonstrating the high utilization and high solubility of Li in the Sb—Pb alloy. The cell also exhibited a high coulombic efficiency of 99.5% during the first twelve cycles. The round-trip energy efficiency was 65%.

Additional cells have been constructed with an alloy composition of Li$_{8.182}$Sb$_3$Pb$_7$ (45 mol % Li), and have exhibited high utilization of the Li, achieving 1.35 Ah of capacity (vs. 1.5 Ah theoretical, or 90% Li utilization).

Example 3

Figure 9:
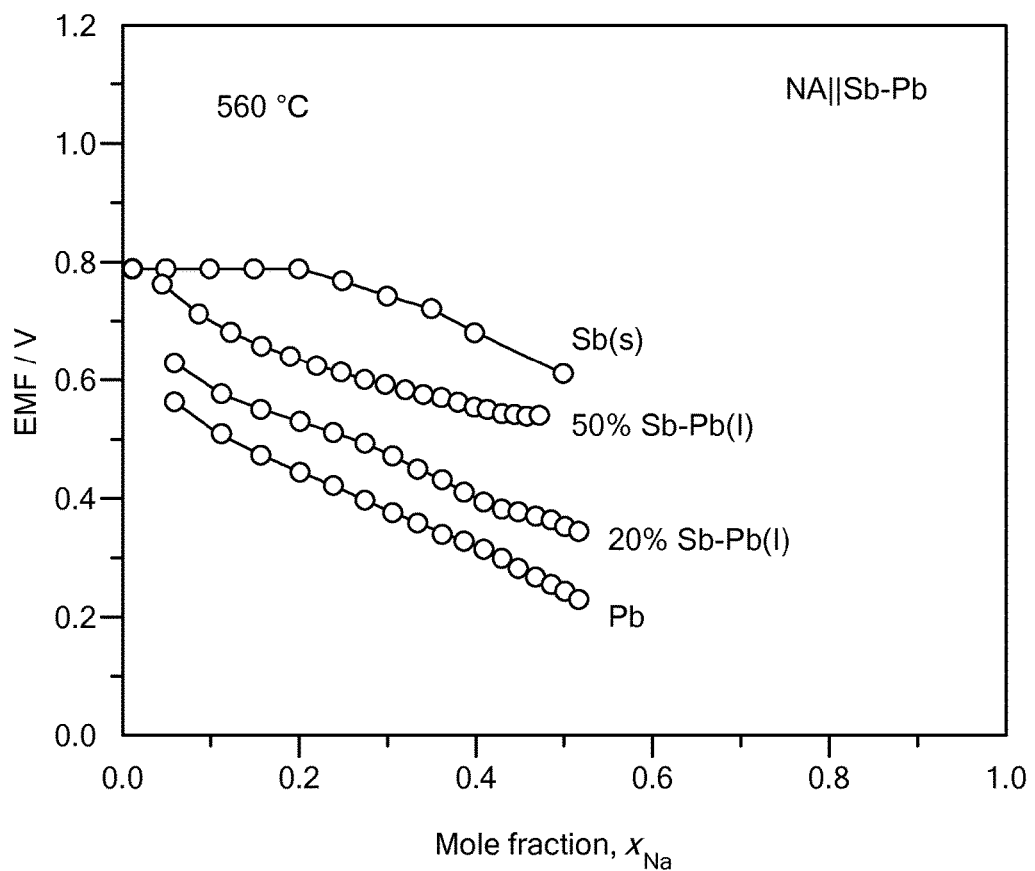
FIG. 9 is a plot of the measured voltage at 500° C. of various Sb—Pb concentrations as a function of Na concentration.

Na metal was deposited into Sb—Pb alloys of various compositions (i.e. 40:60 mol %, 30:70 mol %, and 18:82 mol %). As the Na was deposited, the voltage was recorded between Na—Sb—Pb alloy and Na. A plot of the measured voltage at 500° C. of various Sb—Pb concentrations as a function of Na concentration is shown in FIG. 9.

The embodiments of energy storage device of the invention described above may combine capacity, economy, flexibility and long life. Although specific features of the invention are included in some embodiments and drawings and not in others, it should be noted that each feature may be combined with any or all of the other features in accordance with the invention. It will therefore be seen that the foregoing represents a highly advantageous approach to storage for small-scale, medium-scale, and large-scale systems, as well as enhancing commercial energy management. The terms and expressions employed herein are used as terms of description and not of limitation, and there is no intention, in the use of such terms and expressions, of excluding any equivalents of the features shown and described or portions thereof.

The embodiments of the invention described above and illustrated in the drawings are intended to be merely exemplary; numerous variations and modifications will be apparent to those skilled in the art. All such variations and modifications are intended to be within the scope of the present invention as defined in any of the appended claims.

What is claimed is:

1. A method for charging or discharging an energy storage system with the aid of an external load, comprising:
    (a) providing the energy storage system, the energy storage system comprising an array of energy storage devices, each energy storage device comprising:
        (i) a negative electrode comprising an active alkali metal, wherein the negative electrode has a first volume;
        (ii) a positive electrode that comprises (i) antimony and (ii) an additive that is present at an amount that decreases a melting point of the positive electrode, wherein the decreased melting point is at a temperature below about 500° C., and wherein the positive electrode has a second volume; and
        (iii) a substantially mobile liquid electrolyte disposed between the negative electrode and the positive electrode, wherein the liquid electrolyte comprises a halide salt of the active alkali metal that conducts the active alkali metal from the electrolyte to the positive electrode or from the positive electrode to the electrolyte; and
    (b) charging or discharging the energy storage system through the external load that is electrically coupled to the energy storage system, wherein (i) during discharge of the energy storage device, the second volume increases, or (ii) during charge of the energy storage device, the second volume decreases,
    where the additive in the positive electrode includes tin, and
    a ratio of the antimony to the tin is between about 18:82 and 66.6:33.3.

2. The method of claim 1, wherein, during charge/discharge, a volume of the electrolyte is substantially constant.

3. The method of claim 1, wherein the negative electrode, the positive electrode, or both are liquid at an operating temperature of the energy storage device.

4. The method of claim 1, wherein the positive electrode comprises the antimony and the additive when the positive electrode is fully depleted of the active alkali metal.

5. The method of claim 4, wherein the additive is not an alkali metal.

6. The method of claim 1, wherein the active alkali metal includes a material selected from the group consisting of lithium, sodium, and potassium.

7. The method of claim 1, wherein each energy storage device has a discharge voltage of less than about 0.7 V when cycled at a current density of about 250 mA/cm$^2$.

8. The method of claim 1, wherein (i) during discharge of the energy storage system, the liquid electrolyte conducts the active alkali metal from the negative electrode, and (ii) during charge of the energy storage system, the liquid electrolyte conducts the active alkali metal from the positive electrode.

9. The method of claim 1, wherein (i) during discharge of the energy storage system, the second volume increases, and (ii) during charge of the energy storage system, the second volume decreases.

10. The method of claim 1, wherein the energy storage system has an energy storage capacity of at least about 30 kWh at an operating temperature of at least about 400° C.

11. The method of claim 1, wherein the active element is a metal or a metalloid.

12. The method of claim 1, wherein each energy storage device is an energy storage cell, and wherein the energy storage system comprises a plurality of energy storage cells.

13. An energy storage device comprising:
    an active alkali metal present during operation in each of a negative electrode, a positive electrode and a substantially mobile electrolyte disposed between the negative electrode and the positive electrode,
    wherein the electrolyte is liquid at an operating temperature of the energy storage device,
    wherein the negative electrode, the positive electrode, or both are liquid at the operating temperature of the energy storage device, and
    wherein the positive electrode comprises (i) antimony and (ii) an additive that is present at an amount that decreases a melting point of the positive electrode, which decreased melting point is at a temperature below about 500° C.,
    wherein the additive includes tin, and
    a molar ratio of the antimony to the tin is between about 18:82 and 66.6:33.3.

14. The energy storage device of claim 13, wherein the active alkali metal is present in an elemental form in the negative electrode, an alloy form in the positive electrode, and a salt in the electrolyte.

15. The energy storage device of claim 13, wherein the positive electrode is liquid at the operating temperature of the energy storage devices.

16. The energy storage device of claim 13, wherein the active alkali metal (i) alloys with the antimony upon discharge, (ii) de-alloys from the antimony upon charge, or (iii) both alloys with the antimony upon discharge and de-alloys from the antimony upon charge.

17. The energy storage device of claim 13, wherein the electrolyte has a thickness that remains substantially constant upon charging or discharging of the energy storage system.

18. The energy storage device of claim 13, wherein, during operation of the energy storage system, a thickness of the positive electrode increases or decreases.

19. The energy storage device of claim 13, wherein the antimony and the additive remain in the positive electrode upon charge/discharge.

20. The energy storage device of claim 13, wherein the melting point of the positive electrode is less than or equal to the operating temperature of the energy storage device, which operating temperature is below about 500° C.

21. The energy storage device of claim 20, wherein the operating temperature is between about 400° C. and 500° C.

22. The energy storage device of claim 13, wherein the electrolyte transfers cations of the alkali metal (i) from the negative electrode to the electrolyte during discharging and (ii) from the positive electrode to the electrolyte during charging.

23. The energy storage device of claim 13, wherein each of the negative electrode, positive electrode and electrolyte is liquid at the operating temperature of the energy storage system.

24. The energy storage device of claim 23, wherein, at the operating temperature, two or more of the negative electrode, positive electrode and electrolyte form a layered structure that is vertically stacked according to respective densities of the two or more negative electrode, the positive electrode and the electrolyte, and wherein the layered structure spontaneously self-assembles upon heating.

25. The energy storage device of claim 13, wherein the electrolyte is at least about 50% thinner than (i) the positive electrode or (ii) the negative electrode.

26. The energy storage device of claim 13, wherein the additive is present in the positive electrode at a concentration of at least about 25%.

27. The energy storage device of claim 13, wherein an interface between the positive electrode and the electrolyte is movable.

* * * * *